UNITED STATES PATENT OFFICE.

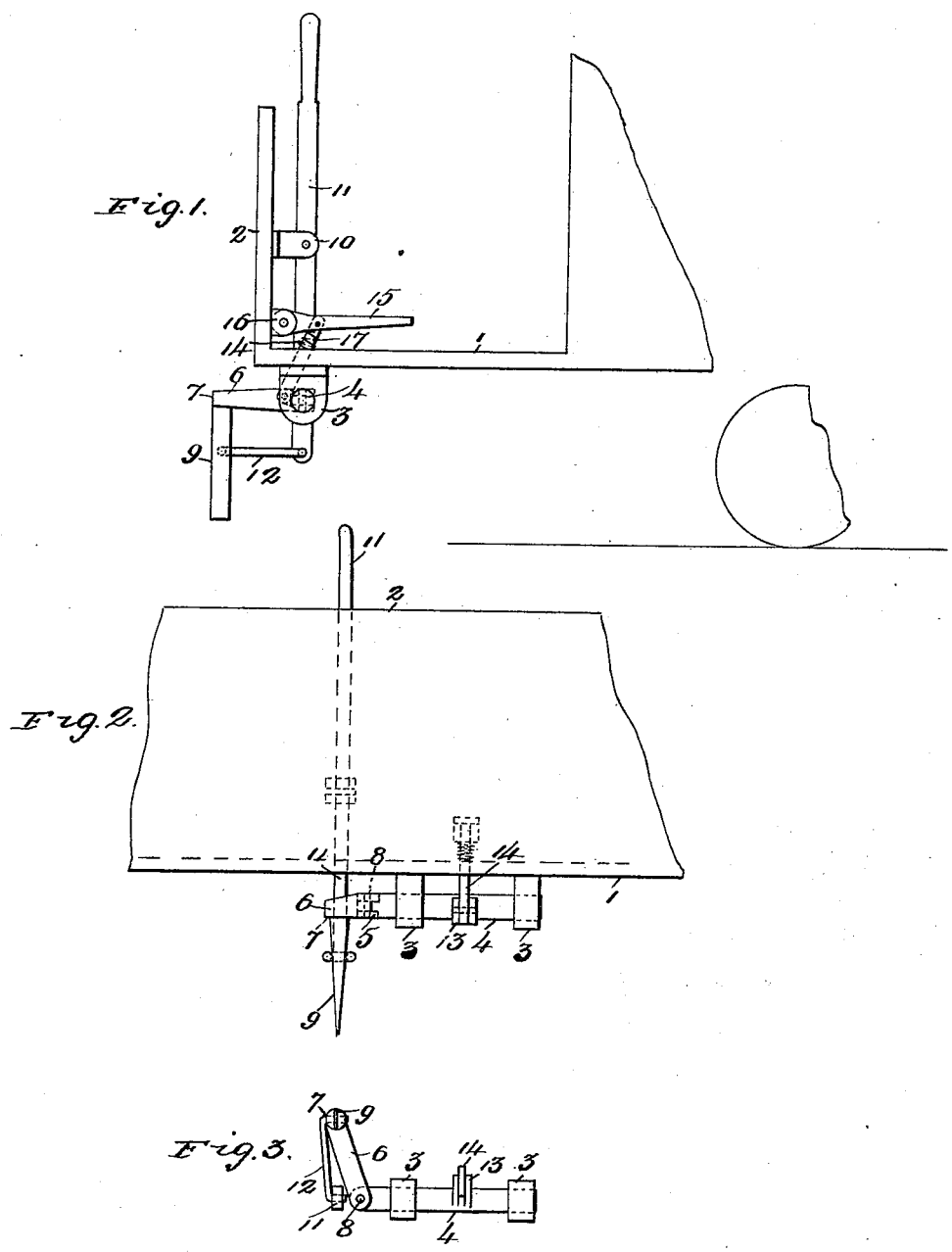

OSCAR WARD, JR., OF NEW CANTON, ILLINOIS, ASSIGNOR OF TWO-THIRDS TO JOHN W. BRAMMELL AND EMMA M. BRAMMELL, OF SAME PLACE.

SWITCH-THROWER.

SPECIFICATION forming part of Letters Patent No. 620,813, dated March 7, 1899.

Application filed July 25, 1898. Serial No. 686,863. (No model.)

*To all whom it may concern:*

Be it known that I, OSCAR WARD, Jr., a citizen of the United States, residing at New Canton, in the county of Pike and State of Illinois, have invented certain new and useful Improvements in Switch-Throwers, of which the following is a full, clear, and exact description, reference being had to the accompanying drawings, forming a part hereof.

My invention relates to improvements in switch-throwers; and it consists in the novel combination and arrangement of parts, as will be hereinafter more particularly described, and pointed out in the claim.

In the drawings, Figure 1 is a side elevation of my complete invention as applied to the platform of a car. Fig. 2 is a front view of the same, and Fig. 3 is a bottom plan view thereof.

The object of my invention is to construct a simple and effective switch-thrower which may be readily attached and carried by the platform of an ordinary street-car and in convenient reach of the motorman or operator, whereby the throwing of the switch to direct the direction of a car is greatly facilitated and without the necessity of stopping the car.

Briefly stated, the invention consists of a shaft located below the platform of the car and journaled thereto, a foot-lever in movable connection with said shaft and located slightly above the floor of the platform, a spring for holding said foot-lever in an elevated position, a thrower which coöperates with the ordinary switch, forming a part of the track and hinged to one end of the shaft, a hand-lever pivoted to the dashboard of the platform and projecting through the platform, and suitable connection between said thrower and lever.

Referring to the drawings, 1 represents the platform of an ordinary street-car, and 2 the dashboard of the same. To the lower or under surface of the platform 1 are secured two bearings 3, which loosely receive a short shaft 4, one end of which projects a suitable distance from one of said bearings and is flattened and received by the forked end 5 of the horizontal member 6 of the switch-thrower 7, a pin 8 being passed through said flattened end of the shaft and fork, forming a hinged connection. To the outer free end of the horizontal member of the switch-thrower is rigidly secured or formed with the same a depending wedge-shaped extension 9, which coöperates with the switch. Secured to the dashboard 2 of the platform is a fork 10, to which is hinged the medial portion of a hand-lever 11, the lower end of which extends through an opening in the platform and a suitable distance below the same. To the lower end of the lever 11 is movably secured one end of a connecting-rod 12, the opposite end thereof being attached to the depending wedge-shaped extension of the switch-thrower. Secured to the shaft 4 and located between the bearings for the same is a fork 13, to which is movably secured the lower end of a vertical rod 14, the latter passing loosely through an opening formed in the platform of the car and its upper end similarly connected to the medial portion of a foot-lever 15, one end of which is loosely hinged to a bearing 16, secured to the dashboard of the platform. Encircling the rod 14 and interposed between the foot-lever 15 and upper surface of the floor of the platform is a coiled spring 17, which operates to hold said lever in an elevated position when not in use.

When the device is not in use, the wedge-shaped end of the switch-thrower is in an elevated position or out of contact with the track; but should it be desired to throw the switch the foot-lever 15 is depressed, causing the wedge-shaped end of the switch-thrower to be lowered and brought in contact with the track or in a position to coöperate with switch, after which the hand-lever 11 is operated, which gives the switch-thrower a lateral movement, and in consequence throw the switch in the direction desired.

Having fully described my invention, what I claim is—

A switch-thrower comprising a shaft journaled to the platform of the car to which the said thrower is hinged, a rod passing through said platform, one end of which is movably attached to said shaft, a foot-lever, one end of which is hinged to the platform and to which the said rod is movably secured, a coiled spring encircling said rod and interposed between said lever and platform, a hand-lever hinged to the dashboard, and a connecting-rod attached to the said thrower and lower end of said hand-lever, substantially as described.

In testimony whereof I affix my signature in presence of two witnesses.

OSCAR WARD, JR.

Witnesses:
R. L. ARNOLD,
W. H. HYDE.